United States Patent
Warren et al.

(10) Patent No.: US 10,732,590 B1
(45) Date of Patent: Aug. 4, 2020

(54) ENERGY MANAGEMENT (71) Applicant: Vivint, Inc., Provo, UT (US)

(72) Inventors: Jeremy B. Warren, Draper, UT (US);
Matthew J. Eyring, Provo, UT (US);
James Ellis Nye, Alpine, UT (US);
Jungtaik Hwang, Draper, UT (US);
Tim Lott, Orem, UT (US); Luke Langford, Lehi, UT (US); Wade Shearer, Lehi, UT (US)

(73) Assignee: Vivint, Inc., Provo, UT (US)

(*) Notice: Subject to any disclaimer, the term of this patent is extended or adjusted under 35 U.S.C. 154(b) by 78 days.

(21) Appl. No.: 15/964,606

(22) Filed: Apr. 27, 2018

Related U.S. Application Data (63) Continuation of application No. 14/444,868, filed on Jul. 28, 2014, now Pat. No. 9,958,844.

(60) Provisional application No. 61/859,766, filed on Jul. 29, 2013.

(51) Int. Cl.
*G05B 15/02* (2006.01)

(52) U.S. Cl.
CPC ............................ *G05B 15/02* (2013.01)

(58) Field of Classification Search
CPC ........................................... G05B 15/02
See application file for complete search history.

(56) References Cited

U.S. PATENT DOCUMENTS

| | | |
|---|---|---|
| 6,868,293 B1 | 3/2005 | Schurr et al. |
| 8,350,697 B2 | 1/2013 | Trundle et al. |
| 8,818,758 B1 | 8/2014 | Singh et al. |
| 2002/0178047 A1 | 11/2002 | Or et al. |
| 2004/0133314 A1* | 7/2004 | Ehlers ............... G06Q 10/10 700/276 |
| 2006/0015609 A1* | 1/2006 | Hagale ............... H04L 67/24 709/224 |
| 2006/0161450 A1 | 7/2006 | Carey et al. |
| 2008/0306985 A1 | 12/2008 | Murray et al. |
| 2010/0063832 A1 | 3/2010 | Brown |
| 2010/0082174 A1 | 4/2010 | Weaver |
| 2010/0117625 A1* | 5/2010 | Botts ............... G01R 22/10 324/103 R |
| 2010/0217550 A1 | 8/2010 | Crabtree et al. |
| 2010/0289643 A1 | 11/2010 | Trundle et al. |
| 2011/0022242 A1 | 1/2011 | Bukhin et al. |
| 2011/0046792 A1 | 2/2011 | Imes et al. |
| 2011/0046805 A1 | 2/2011 | Bedros et al. |
| 2011/0071694 A1 | 3/2011 | Mammone |
| 2011/0264290 A1* | 10/2011 | Drew ............... G05D 23/1923 700/291 |
| 2011/0282504 A1 | 11/2011 | Besore et al. |
| 2011/0307112 A1 | 12/2011 | Barrilleaux |
| 2012/0101646 A1 | 4/2012 | Nydegger et al. |
| 2012/0117503 A1 | 5/2012 | Hofrichter et al. |
| 2012/0310416 A1 | 12/2012 | Tepper et al. |
| 2012/0323385 A1 | 12/2012 | Thiruvengada et al. |

(Continued)

*Primary Examiner* — Christopher E. Everett
(74) *Attorney, Agent, or Firm* — Holland & Hart, LLP (57) ABSTRACT

A method for energy management is described. In one embodiment, an aspect of a dwelling is monitored. The monitored aspect of the dwelling is compared to an energy policy to determine a deviation of the monitored aspect of the dwelling from a setting of the energy policy. A notification is sent to an occupant, the notification comprising the deviation of the monitored aspect of the dwelling from the setting of the energy policy.

18 Claims, 7 Drawing Sheets

(56) References Cited

U.S. PATENT DOCUMENTS

| | | |
|---|---|---|
| 2013/0085614 A1 | 4/2013 | Wenzel et al. |
| 2013/0086602 A1* | 4/2013 | Mikan .................... H04L 67/24 |
| | | 725/10 |
| 2014/0058806 A1 | 2/2014 | Guenette et al. |
| 2016/0139582 A1 | 5/2016 | Matsuoka et al. |
| 2016/0232549 A1 | 8/2016 | Guenette et al. |

* cited by examiner

ENERGY MANAGEMENT

CROSS REFERENCES

The present Application is a continuation of U.S. patent application Ser. No. 14/444,868, titled "ENERGY MANAGEMENT," filed on Jul. 28, 2014, which claims priority to U.S. Provisional patent application Ser. No. 61/859,766, titled: "SYSTEMS AND METHODS FOR ENERGY MANAGEMENT", filed on Jul. 29, 2013, the disclosures of which are incorporated herein by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and home security products. Advancements in mobile devices allow users to monitor a home or business. Information related to energy management, however, is not always readily available. As a result, benefits may be realized by providing systems and methods for energy management in relation to home automation systems.

SUMMARY

According to at least one embodiment, a method for energy management is described. In one embodiment, an aspect of a dwelling may be monitored. The monitored aspect of the dwelling may be compared to an energy policy to determine a deviation of the monitored aspect of the dwelling from a setting of the energy policy. A notification may be sent to an occupant, the notification comprising the deviation of the monitored aspect of the dwelling from the setting of the energy policy.

In some embodiments, the aspects of the dwelling that may be monitored may include at least one of a dwelling energy consumption, a current energy price, a peak energy price, a current status of an appliance, an energy consumption of the appliance, a start time of a product used in association with the appliance, an estimated remaining amount of the product associated with the appliance, a detected motion of the occupant in the dwelling, a proximity of the occupant to the dwelling, a time of day, a lighting schedule, a programmable scene, a cost efficiency goal, a position of a door, a position of a window, a temperature inside the dwelling, a temperature outside the dwelling, a weather forecast, and a temperature schedule.

In one embodiment, an efficiency of an appliance may be calculated based on the energy consumption of the monitored appliance and a detected value associated with the dwelling resulting from operating the appliance. An efficiency of an air conditioning appliance of the dwelling may be calculated based on both the monitored energy consumption of the air conditioning appliance and a temperature of the dwelling resulting from operating the air conditioning appliance. A trend of energy consumption may be calculated based on the energy consumption of the monitored appliance. A dwelling energy efficiency score may be calculated based on at least one of the monitored dwelling energy consumption and the energy consumption of the monitored appliance.

In one embodiment, the occupant may be allowed to automatically post the monitored aspect of the dwelling according to a setting of the energy policy. The notification sent to the occupant may include a comparison of a corresponding aspect of another dwelling with the monitored aspect of the dwelling posted by the occupant. The dwelling energy efficiency score may be at least partially based on comparison of the corresponding aspect of another dwelling with the monitored aspect of the dwelling posted by the occupant. A gaming user interface may be provided to allow the occupant of the dwelling to compete against at least one other occupant of another dwelling, each occupant competing to minimize energy consumption of their respective dwelling. The notification sent to the occupant may include a reminder to replace the product used in association with the appliance. The reminder may be at least partially based on the start time of the product used in association with the appliance.

In one embodiment, the monitored energy consumption of the dwelling may be compared to an estimate of the energy consumption of the dwelling with solar power added to the dwelling. The notification sent to the occupant may include an estimated power savings by adding solar power to the dwelling. A lighting element of the dwelling may be adjusted based at least partially on at least one of monitored aspects of the dwelling. A temperature element of the dwelling may be adjusted based at least partially on at least one of monitored aspects of the dwelling.

A computing device configured for energy management is also described. The computing device may include a processor and memory in electronic communication with the processor. The memory may store computer executable instructions that when executed by the processor cause the processor to perform the steps of monitoring an aspect of a dwelling, comparing the monitored aspect of the dwelling to an energy policy to determine a deviation of the monitored aspect of the dwelling from a setting of the energy policy, and sending a notification to an occupant. In some cases, the notification may include the deviation of the monitored aspect of the dwelling from the setting of the energy policy.

A non-transitory computer-readable storage medium storing computer executable instructions is also described. When the instructions are executed by a processor, the execution of the instructions may cause the processor to perform the steps of monitoring an aspect of a dwelling, comparing the monitored aspect of the dwelling to an energy policy to determine a deviation of the monitored aspect of the dwelling from a setting of the energy policy, and sending a notification to an occupant. In some cases, the notification may include the deviation of the monitored aspect of the dwelling from the setting of the energy policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to home automation. More specifically, the systems and methods described herein relate to energy management in relation to a home automation system. Some embodiments of the systems and methods described herein relate to energy management in relation to an integration of home automation and a subscriber-based media content set top box, such as a satellite and/or cable digital video recorder (DVR).

In one example, a user may desire to receive an alert in association with monitoring energy consumption in a dwelling. For example, an occupant of a dwelling may want to know when an anomaly in energy consumption is detected. Presently, an occupant of the dwelling may have to remind himself (or herself) to manually check appliances and replace products associated with the appliances, such as air filters, water filters, and the like. The present systems and methods provide the means for monitoring one or more aspects of a dwelling and informing an occupant of the dwelling of current conditions and anomalies associated with the energy consumption of the dwelling. Moreover, the systems and methods described herein may provide energy management and notifications in relation to the monitored aspects of the dwelling. Furthermore, the systems and methods described herein may provide energy management and notifications in relation to a channel of a subscriber-based media content set top box.

Figure 1:
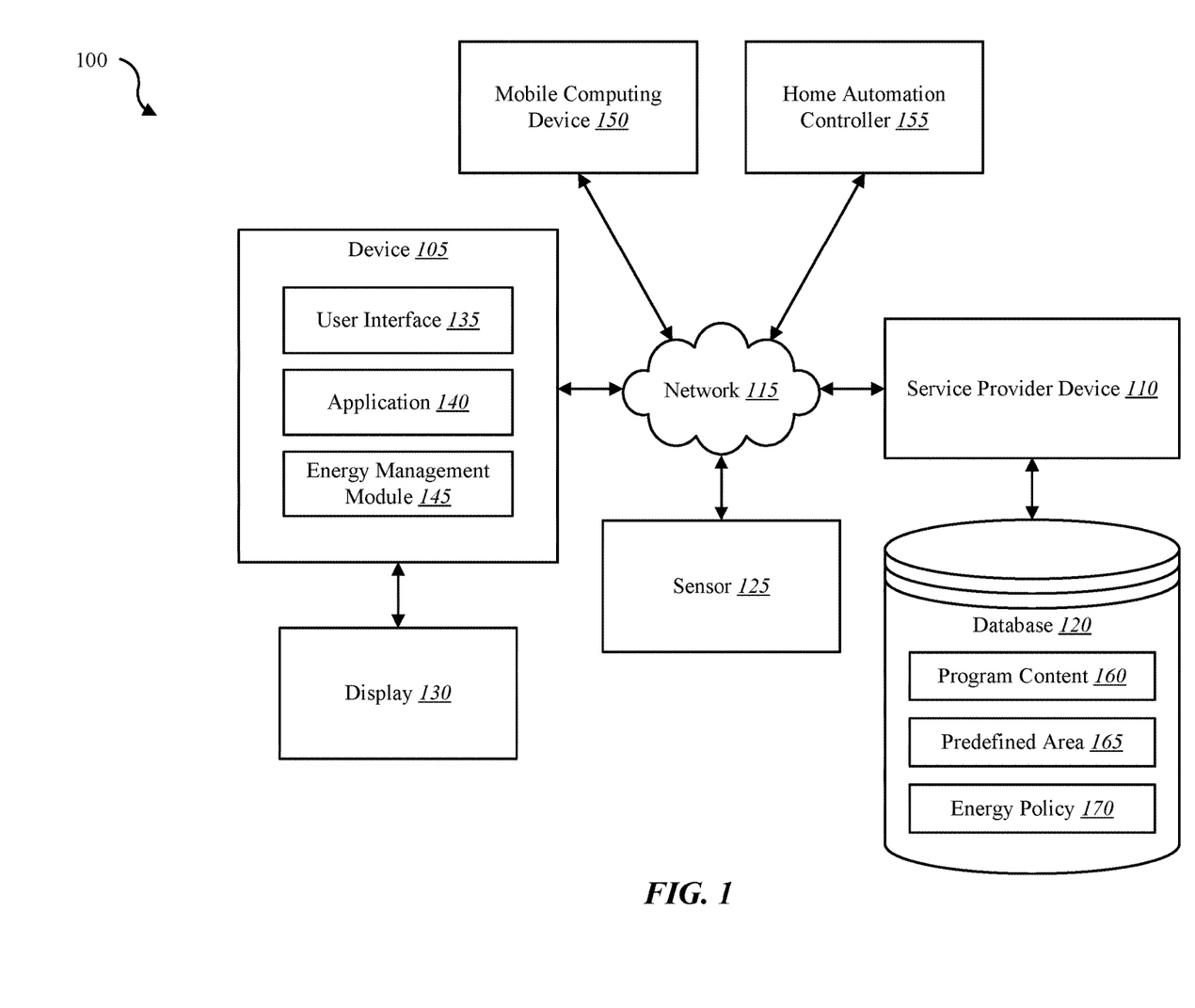
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, service provider device 110, a sensor 125, a display 130, a mobile computing device 150, a home automation controller 155, and a network 115 that allows the device 105, the service provider device 110, the mobile computing device 150, home automation controller 155, and sensor 125 to communicate with one another. Examples of the device 105 include media content set top box, satellite set top box, cable set top box, DVRs, personal video recorders (PVRs), mobile devices, smart phones, personal computing devices, computers, servers, etc. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like. Examples of sensor 125 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105. Additionally, or alternatively, sensor 125 may be integrated with a home appliance or fixture such as a light bulb fixture. Sensor 125 may include an accelerometer to enable sensor 125 to detect a movement. For example, sensor 125 may be attached to a set of golf clubs in a garage area. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125 associated with a user. Sensor 125 may include a proximity sensor to enable sensor to detect proximity of a person relative to a predetermined distance from a dwelling (e.g., geo-fencing).

In some configurations, the device 105 may include a user interface 135, application 140, and energy management module 145. Although the components of the device 105 are depicted as being internal to the device 105, it is understood that one or more of the components may be external to the device 105 and connect to device 105 through wired and/or wireless connections. In some embodiments, application 140 may be installed on mobile computing device 150 in order to allow a user to interface with a function of device 105, energy management module 145, home automation controller 155, and/or service provider device 110.

In some embodiments, device 105 may communicate with service provider device 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include an energy management module 145. For example, device 105 may include application 140 that allows device 105 to interface with home automation controller 155 via energy management module 145 located on another device such as mobile computing device 150 and/or service provider device 110. In some embodiments, device 105, home automation controller 155, and service provider device 110 may include an energy management module 145 where at least a portion of the functions of energy management module 145 are performed separately and/or concurrently on device 105, home automation controller 155, and/or service provider device 110. Likewise, in some embodiments, a user may access the functions of device 105 and/or home automation controller 155 (directly or through device 105 via energy management module 145) from mobile computing device 150. For example, in some embodiments, mobile computing device 150 includes a mobile application that interfaces with one or more functions of device 105, home automation controller 155, energy management module 145, and/or service provider device 110.

In some embodiments, service provider device 110 may be coupled to database 120. Database 120 may include program content 160, a predefined area 165 (e.g., an area of the dwelling), and an energy policy 170 associated with the energy consumption of the dwelling. For example, device 105 may access program content 160 in database 120 over network 115 via service provider device 110. Database 120 may be internal or external to the service provider device 110. In one example, device 105 may be coupled directly to database 120, database 120 being internal or external to device 105.

Energy management module 145 may allow a user to control (either directly or via home automation controller 155), from a subscription-content media set top box, an aspect of the home or office of the user, including security, locking or unlocking a door, checking the status of a door, locating a person or item, controlling lighting, thermostat, cameras, receiving notification regarding a current status or anomaly associated with the home or office of the user, and the like. In some configurations, application 140 may enable device 105 to interface with home automation controller 155 via energy management module 145 to provide home automation content to device 105 and/or mobile computing device 150. Thus, application 140, via the energy management module 145, may allow users to control aspects of their home. Further details regarding the energy management module 145 are discussed below.

Figure 2:
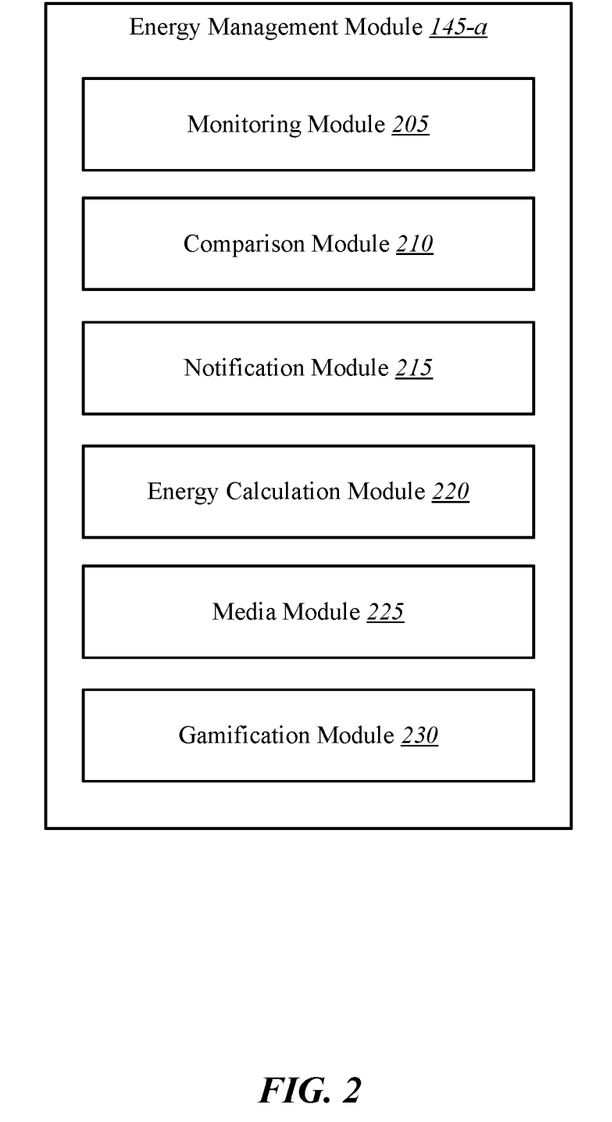
FIG. 2 is a block diagram illustrating one example of an energy management module.

FIG. 2 is a block diagram illustrating one example of an energy management module 145-a. Energy management module 145-a may be one example of energy management module 145 depicted in FIG. 1. As depicted, energy management module 145-a may include monitoring module 205, comparison module 210, notification module 215, energy calculation module 220, media module 225, and gamification module 230.

In some embodiments, service provider device 110 may provide subscriber program content (cable/satellite television programming, for example) to a user via a set top box located in a home, office, etc., of the user. Examples of set top boxes include cable set top boxes, satellite set top boxes, DVRs, PVRs, and the like. Monitoring module 205 may be configured to monitor a status of an asset, of a vehicle, to track an asset, to track a vehicle, etc. Monitoring module 205 may monitor a status of an aspect of a dwelling in conjunction with sensor 125. For example, sensor 125 may detect an occupant leaving from or arriving at predefined area 165 (e.g., a dwelling of the occupant). Upon detecting the occupant arriving, an aspect of the dwelling may be modified. For example, energy management module 145-a may adjust a lighting and/or temperature setting.

In one embodiment, monitoring module 205 may monitor an aspect of a dwelling. The aspect of the dwelling may include at least partially one of a dwelling energy consumption, a current energy price, a peak energy price, a current status of an appliance, an energy consumption of the appliance (e.g., via current transformer (CT) clamps measuring the strength of the magnetic field that is created as electricity flows through wires associated with the appliance), a start time of a product used in association with the appliance (e.g., replacing an air filter of a furnace), an estimated remaining amount of the product associated with the appliance, a detected motion of the occupant in the dwelling, a proximity of the occupant to the dwelling, a time of day, a lighting schedule, a programmable scene, a cost efficiency goal, a position of a door, a position of a window, a temperature inside the dwelling, a temperature outside the dwelling, a weather forecast, and a temperature schedule. In some embodiments, one or more monitored aspects of a dwelling may be sent to a server (e.g., a cloud server). The one or more monitored aspects of the dwelling may be processed and evaluated at the server For example, the one or more monitored aspects of the dwelling may be compared to one or more aspects of another dwelling and/or one or more aspects of averaged aspects of a group of dwellings. Based on the processing and evaluation at the server, energy management module 145-a may provide automation for the one or more aspects of the dwelling. Additionally, or alternatively, energy management module 145-a may provide information (e.g., a breakdown of energy use at the dwelling) and advice to an occupant of the dwelling based on the processing and evaluation of the one or more aspects of the dwelling. Examples of advice that may be provided to the occupant may include adding thermal coatings to windows of the dwelling, using LED lighting, replacing furnace filters, using a programmable thermostat, implementing automated light switches, implementing automated power outlets, implementing geo-location, implementing disaggregation of energy consumption, (e.g., via CT clamps). Additionally, or alternatively, energy management module 145-a may detect anomalies in the energy consumption of the dwelling, determine a cause of the anomalies, and provide notification regarding the detected anomalies.

In one embodiment, comparison module 210 may compare the monitored aspect of the dwelling to an energy policy to determine a deviation of the monitored aspect of the dwelling from a setting of the energy policy. Notification module 215 may send a notification to an occupant based on the determined deviation of the monitored aspect of the dwelling from a setting of the energy policy. In one embodiment, notification module 215 may generate a notification in response to the monitoring of one or more aspects of the dwelling and/or a detected anomaly associated with the one or more aspects of the dwelling.

In some embodiments, notification module 215, in conjunction with the user interface 135, may display a notification on a display connected to a set top box. Notification module 215 may display the notification in relation to a presently viewed channel of the subscriber program content. In some cases, notification module 215 may display the notification in at least a portion of a viewing area of the channel. For example, a user watching content from a satellite DVR on a television may receive a notification displayed on at least a portion of the screen of the television. For example, a notification relating to detecting a predefined action in relation to a set of golf clubs may be generated and sent to the user via email, text message, voicemail, etc. In relation to a set-top box service, the notification sent to the occupant may include a scrolling message, a picture-in-picture message, and/or switching to a notification or monitoring channel that includes data and/or information in relation to the detected action.

In some embodiments, notification 215 may adapt a notification based on certain conditions. Notification module 215 may determine whether to display a notification on a display based on notification rules (e.g., type of program currently being viewed, type of activity detected, etc.) associated with a current state of device 105. For example, notification 215 may determine whether to display the notification the content provided by a set top box that a user is currently viewing. For instance, based on the notification rules, if the type of activity detected is determined to be a minor notification and if a user is watching sports (e.g., boxing match, baseball, football, etc.), notification 215 may alter the type of notification (e.g., scrolling message instead of picture-in-picture), block the message from being displayed on the television, and/or route the notification to another device, such as an email or a text message sent to a smartphone or tablet device. In some cases, notification module 215 may alter the notification based on the current state of the device 105. For one type of programming and set top box content, notification module 215 may show scrolling text across an edge of the television screen. For another type of programming, notification module 215 may play a sound (e.g., a tone, a combination of tones, a recorded voice notification, a text to speech notification, and the like) based on the type of notification. In some embodiments, notification module 215 may alter the destination of the notification based on the type of notification and/or the type of programming currently being viewed by the user. For example, if the notification rules require minimum notification for a certain type of programming, the notification module 215 may display in alternative modes of communication. For instance, notification module 215 may email or text message a notification to a user based on the type of notification, the type of programming the user is currently watching, whether programming is currently being watched, and/or the current location of the user, etc.

In some cases, notification 215 may determine whether to display a notification in relation to programming currently being watched by the user and how to handle the programming based on the type of notification and/or the type of programming. For example, energy management module 145-a may pause the programming for one type of notification, show a pop up message for another type of notification without pausing the programming, split the screen between a window for a security camera view and a window for the programming for another type of notification, and so forth. Additionally, or alternatively, notification module 215 may pause the programming for one type of notification based on one type of programming, block the notification for the same type of notification based on another type of programming, and continue showing the programming for the same type of notification based on a third type of programming. Additionally, or alternatively, notification module 215 may include in a notification a reminder to replace the product used in association with the appliance, the reminder being at least partially based on the start time of the product used in association with the appliance. Notification module 215 may include in a notification an estimated power savings the occupant may see if the occupant were to add solar power to the dwelling. The notification may include a countdown until solar power will be installed. In one embodiment, comparison module 210 may compare the monitored energy consumption of the dwelling to an estimate of the energy consumption of the dwelling with solar power added to the dwelling.

In some embodiments, upon detecting an aspect of the dwelling satisfying a predetermined threshold (e.g., a monitored aspect of the dwelling indicating an anomaly), media module 225 may pause a subscriber program content currently provided on a channel. For example, the energy management module 145-a may pause and/or record a portion of the content the user was viewing when the notification is displayed. In some cases, the notification sent to the occupant may include a picture in picture notification, a text bar, scrolling text, a pop up, or drop down notification message. In some cases, the presently viewed channel may be paused upon the notification module 215 displaying the notification.

In one embodiment, media module 225 may provide subscriber program content to a user via a set top box located in a home of the user. Monitoring module 205 may monitor an aspect of the home of the user. Media module 225, in conjunction with the user interface 135, may provide a monitor channel to display the monitored aspect of the home to the user. The monitor channel may be displayed in a channel guide among channels of the subscriber program content. For example, a subscription to cable or satellite media content may include a channel guide that includes a list of selectable channels and their respective content. Among the list of channels provided by subscription, energy management module 145-a may append one or more home automation channels that are selectable and interact with user commands in a similar manner as the subscription channels in the channel guide.

In one embodiment, energy calculation module 220 may calculate an efficiency of an appliance based on the energy consumption of the monitored appliance and a value associated with an operation of the appliance. For example, energy calculation module 220 may calculate an efficiency of an air conditioning appliance of the dwelling based on the monitored energy consumption of the air conditioning appliance and a temperature of the dwelling resulting from an operation of the air conditioning appliance. In some cases, energy calculation module 220 may calculate a trend of energy consumption based on the energy consumption of the monitored appliance. For example, energy calculation module 220 may monitor the use of a television over a predetermined period of time. Energy calculation module 220 may calculate a trend of television use, including average and/or peak usage periods, average and/or peak power usage, average and/or peak cost of usage, energy prices associated with usage, etc. Energy management module 145-a may detect an anomaly of energy use associated with an appliance based on the calculated trend of energy use. In some embodiments, energy calculation module 220 may calculate a dwelling energy efficiency score based on at least one of the monitored dwelling energy consumption and the energy consumption of the monitored appliance.

In one embodiment, media module 225 may allow an occupant to automatically post the monitored aspect of the dwelling according to a setting of the energy policy. For example, energy management module 145-*a* may post information related to energy consumption of a dwelling (e.g., energy consumption score) to a social media site such as FACEBOOK®, GOOGLE+®, TWITTER®, etc. Thus, the occupant may be enabled to share and compare energy usage with friends, family, neighbors, etc. Notification module 215 may include in a notification a comparison of a corresponding aspect of another dwelling with the monitored aspect of the dwelling posted by the occupant. For example, based on two or more occupants posting energy consumption data to a server, notification module 215 may send a notification to one of the two occupants indicating how the energy use of the occupant compares to the energy use of another occupant. The dwelling energy efficiency score may be at least partially based on comparison of the corresponding aspect of another dwelling with the monitored aspect of the dwelling posted by the occupant. In one embodiment, gamification module 230 may provide a gaming user interface to allow the occupant of the dwelling to compete against at least one other occupant of another dwelling, where each occupant competes to minimize energy consumption of their respective dwelling. Thus, an occupant may receive an incentive by comparing and sharing their energy consumption with coworkers, family, friends, and neighbors to see how the occupant's energy use compares with the energy use of others. In some cases, the gamification module 230 may display information regarding the energy consumption of an occupants dwelling as well as energy consumption of relative dwellings. In some cases, the occupant may select one or more other dwellings with which to compare the energy consumption of their own dwelling. In some cases, gamification module 230 may automatically select one or more other dwellings and post information regarding the one or more other dwellings anonymously (i.e., without information identifying the address, name, contact information for those one or more dwellings). Additionally, or alternatively, the occupant may select one or more other dwellings. The occupants of the one or more dwellings may choose to opt in and allow their information to be shared with the occupant, and vice versa. In some cases, gamification module 230 may allow the occupants to choose which information to share. In some cases, gamification module 230 may calculate an average energy consumption for the geographic area based on home size, age of the home, etc., and may display this average energy consumption to the occupant alongside the energy consumption of the occupant's dwelling. In some cases, the gamification module 230 may display a list of the overall top energy-efficient dwellings of a geographic area and/or the top energy-efficient dwellings with a predetermined list of dwellings.

In some embodiments, based on an energy efficiency score associated with the dwelling, notification module 215 may provide to the occupant information related to demand response programs. Demand response programs may include changes in electric usage by end-use customers from their normal consumption patterns in response to changes in the price of electricity over time, incentive payments designed to induce lower electricity use at times of high wholesale market prices, or during times when system reliability may be jeopardized. Demand response programs may include intentional modifications to consumption patterns of electricity of end-use customers intended to alter the timing, level of instantaneous demand, and/or the total electricity consumption. For example, notification module 215 may include in a notification an alert notifying occupant that a 5% lowering of demand would result in a 50% price reduction during the peak hours of the electricity consumption within a geographic area.

In one embodiment, energy management module 145*a* may adjust a lighting element of the dwelling based at least partially on at least one of monitored aspects of the dwelling. For example, energy management module 145*a* may adjust a lighting element of the dwelling based on a detected motion of the occupant in the dwelling (e.g., an occupant getting up from a couch to get a drink while watching a television program). Additionally, or alternatively, energy management module 145*a* may adjust a lighting element of the dwelling based on a proximity of the occupant to the dwelling (e.g., turn off the lights when occupant leaves the dwelling, turn on a light when the occupant arrives at the dwelling, etc.), a time of day (e.g., turn on the lights when the alarm sounds, turn on the porch light at dusk, dim the lights at night, etc.), a lighting schedule, and so forth.

In some cases, energy management module 145*a* may adjust a temperature element of the dwelling based at least partially on at least one of monitored aspects of the dwelling. For example, energy management module 145*a* may adjust a temperature element of the dwelling based on a position of a door and/or a window (e.g., open or closed door, open or closed window, etc.), a temperature inside the dwelling, a temperature outside the dwelling, a weather forecast, and a temperature schedule. In some embodiments, energy management module 145*a* may adjust a lighting element and/or temperature element of the dwelling based on a cost efficiency goal set by the occupant.

In some cases, energy management module 145*a* may adjust a lighting element and/or temperature element of the dwelling based on a programmable scene set by the occupant. Programmable scenes may include pre-set settings of energy policy 170 that are associated with lighting, temperature, shutter, blinds, etc. Examples of programmable scenes may include a scene for entertaining, a scene for morning, a scene for breakfast, a scene for lunch, a scene for dinner, and a scene for evening, etc. In one embodiment, a scene may be programmed by the occupant to adjust a lighting element (e.g., turning a light on or off, adjusting a light brightness, dimming a light, etc.), activating a first type of light, deactivating a second type of light, adjusting a color temperature of a light (e.g., adjusting a light fixture from emitting cool blue light to emitting warm orange light), adjusting a thermostat, adjusting automatic blinds and/or shutters, and the like.

Figure 3:
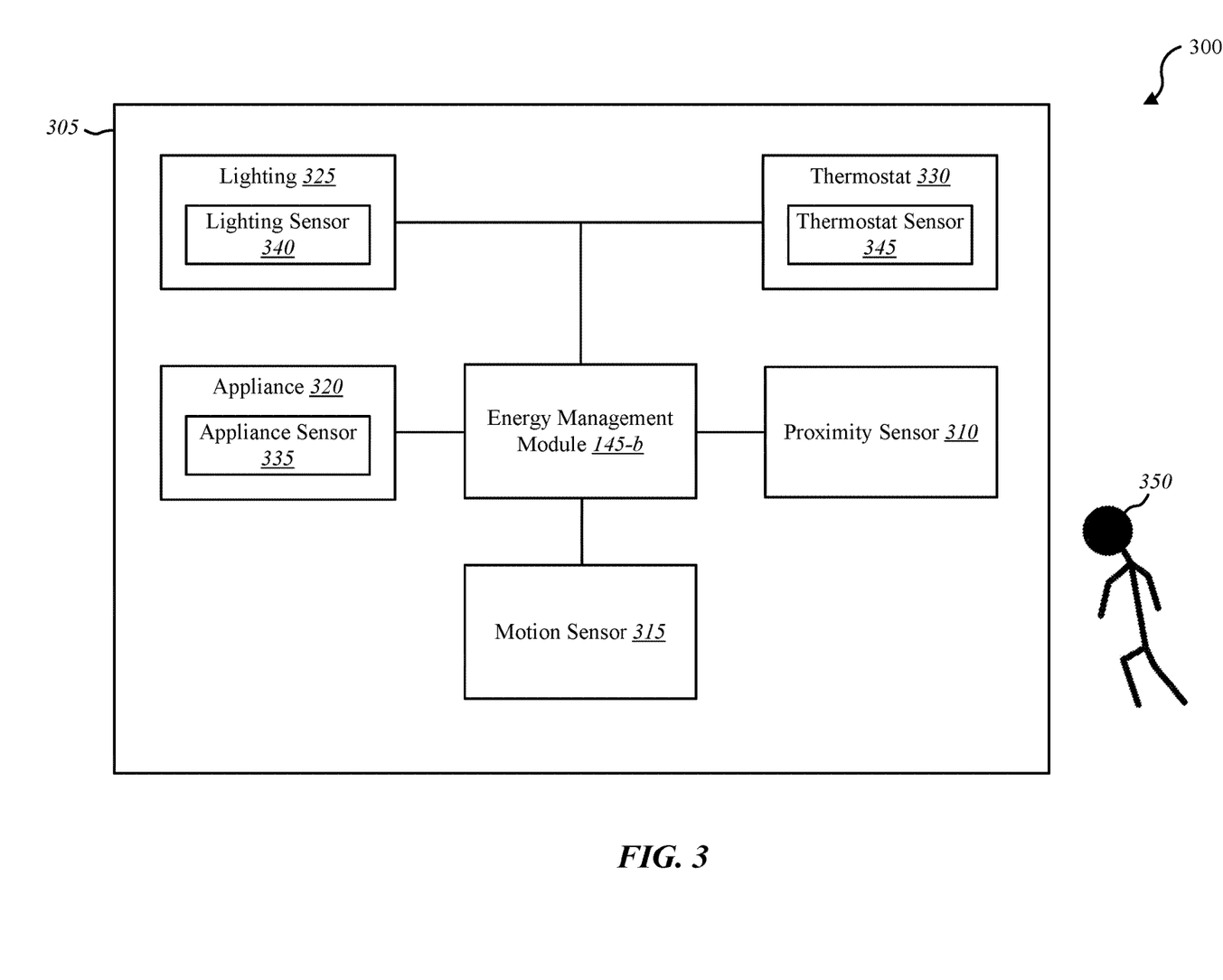
FIG. 3 is a block diagram illustrating one example of an environment for energy management to improve energy consumption of a dwelling.

FIG. 3 is a block diagram illustrating one example of an environment 300 for energy management to improve energy consumption of a pre-defined area 305. As depicted, the predefined area 305 (e.g., dwelling) may include an energy management module 145-*b*, proximity sensor 310, motion sensor 315, appliance 320, lighting 325, and thermostat 330. Appliance 320 may include appliance sensor 335. Lighting 325 may include lighting sensor 340. Energy management module 145-*b* may be one example of energy management module 145 of FIGS. 1 and/or 2. Sensors 310, 315, 335, and 340 may be one example of sensor 125 of FIG. 1.

In one embodiment, proximity sensor 310 may detect occupant 350 arriving at the dwelling 305. Additionally, or alternatively, proximity sensor 310 may detect occupant leaving dwelling 305. In response to detecting occupant 350 arriving and/or leaving dwelling 305, energy management module 145-b may modify an aspect of dwelling 305. For example, energy management module 145-b may turn off all but one light in a home, increase a threshold of when the thermostat 330 is activated (e.g., increase the desired temperature in the summer, lower the desired temperature in the winter), and/or lower the energy consumption of an appliance 320 upon detecting occupant 350 leaving the dwelling 305. In some cases, energy management module 145-b may adjust lighting 325, thermostat 330, and/or appliance 320 according to an output from lighting sensor 340, thermostat sensor 345, and/or appliance sensor 335. Additionally, and/or alternatively, energy management module 145-b may ad lighting 325, thermostat 330, and/or appliance 320 in accordance with energy policy 170.

In some cases, motion sensor 315 may detect a motion of occupant 350 and adjust lighting 325, thermostat 330, and/or appliance 320 accordingly. For example, upon detecting occupant 350 getting up from a couch watching programming on a television, energy management module 145-b may pause the programming and turn up the brightness of a light. In one embodiment, energy management module 145-b may learn one or more detectable motions associated with occupant 350. Additionally, and/or alternatively, energy management module 145-b may be programmed to detect one or more detectable motions associated with occupant 350. For instance, upon detecting occupant 350 retiring for the night, energy management module 145-b may turn off and/or dim all interior lights, turn on one or more exterior lights, set a timer in association with interior and/or exterior lights, adjust thermostat 330 to a nighttime temperature, and decrease the energy consumption of appliance 320.

Figure 4:
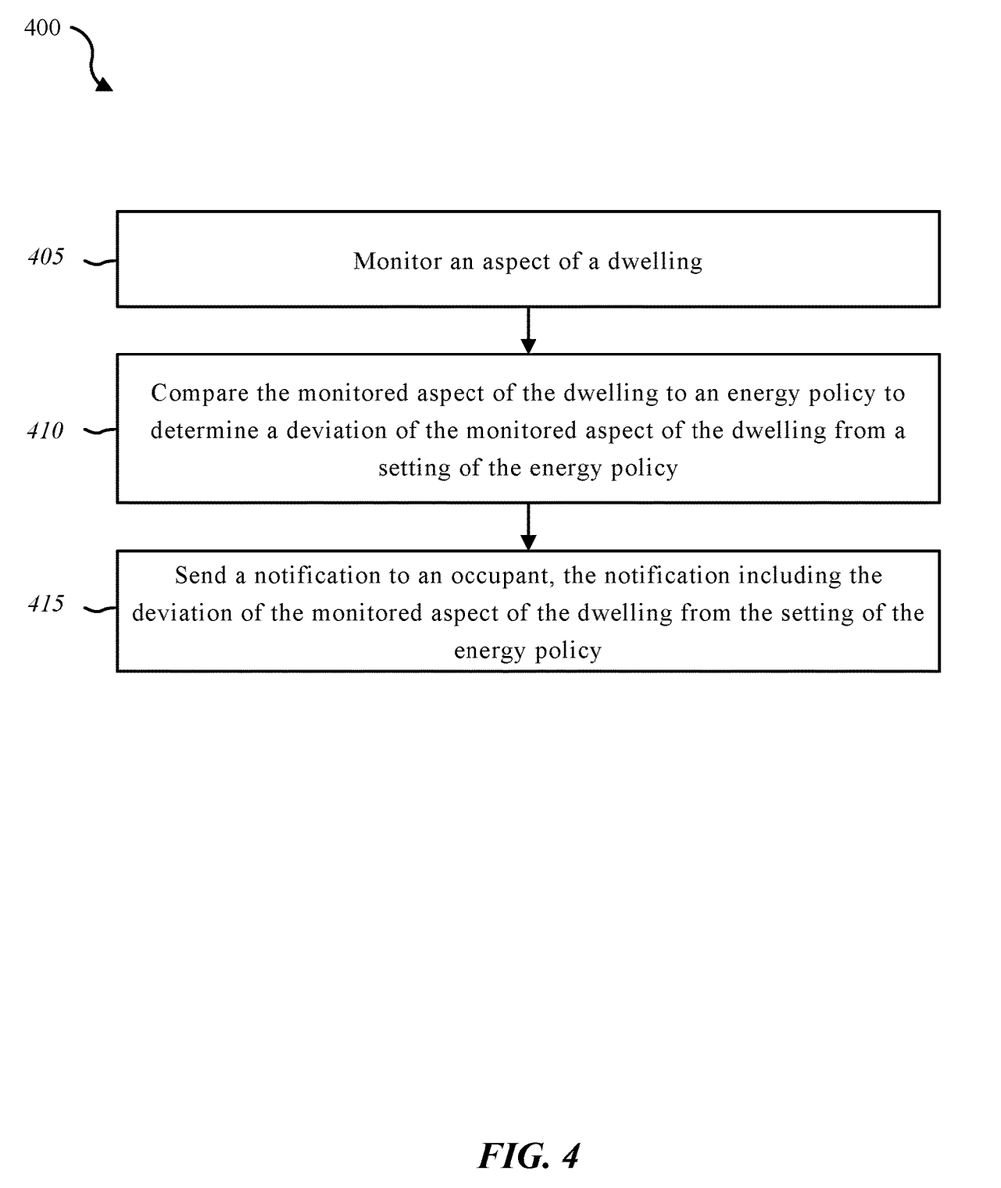
FIG. 4 is a flow diagram illustrating one embodiment of a method for monitoring an aspect of a dwelling for energy management.

FIG. 4 is a flow diagram illustrating one embodiment of a method 400 for monitoring an aspect of a dwelling for energy management. In some configurations, the method 400 may be implemented by the energy management module 145 illustrated in FIG. 1 or 2. In some configurations, the method 400 may be implemented in conjunction with the application 140 and/or the user interface 135 illustrated in FIG. 1.

At block 405, an aspect of a dwelling may be monitored. At block 410, the monitored aspect of the dwelling may be compared to an energy policy to determine a deviation of the monitored aspect of the dwelling from a setting of the energy policy. At block 415, a notification may be sent to an occupant of the dwelling. The notification may include the deviation of the monitored aspect of the dwelling from the setting of the energy policy.

Figure 5:
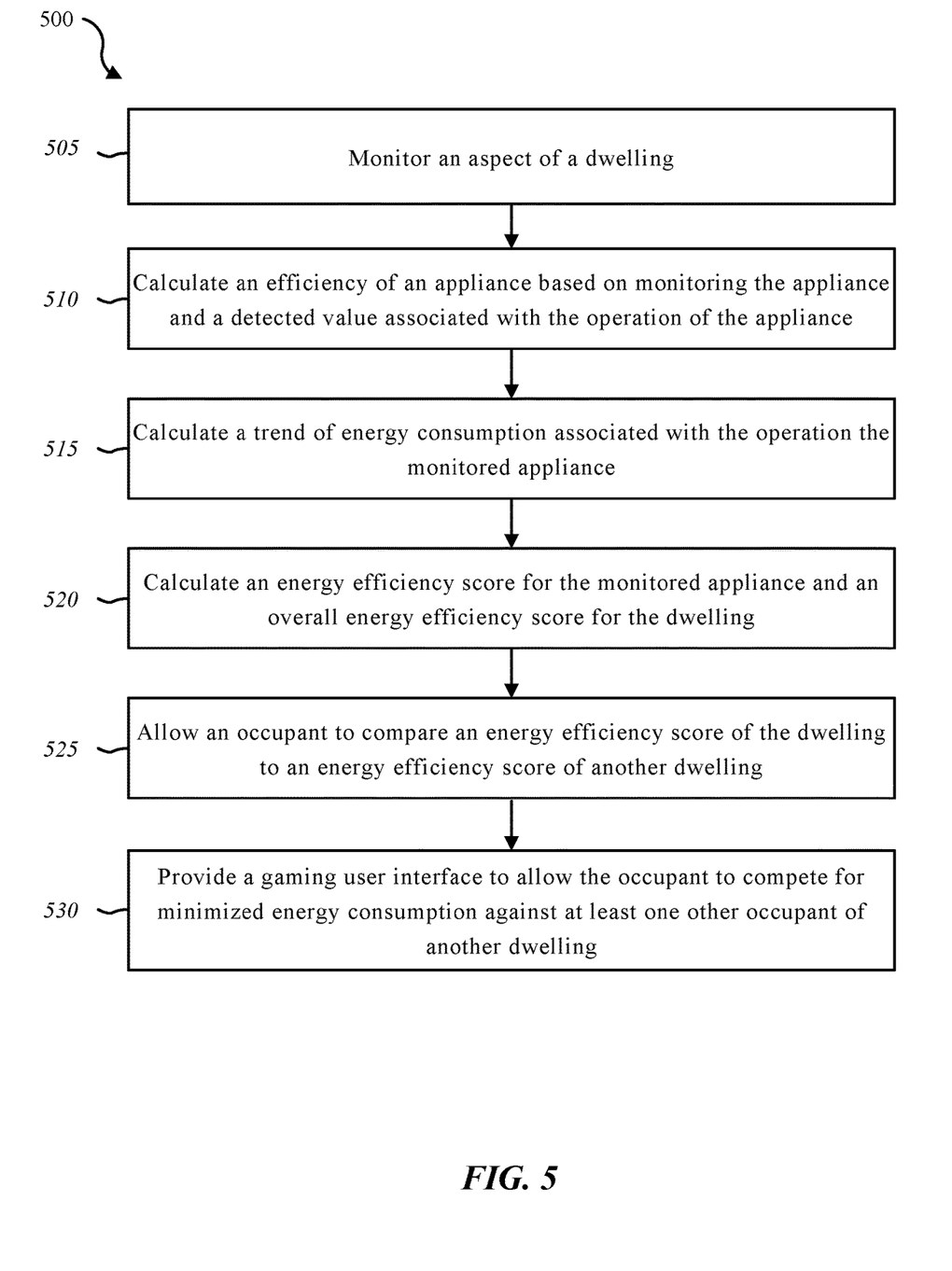
FIG. 5 is a flow diagram illustrating one embodiment of a method for calculating energy efficiency associated with a dwelling.

FIG. 5 is a flow diagram illustrating one embodiment of a method 500 for calculating energy efficiency associated with a dwelling. In some configurations, the method 500 may be implemented by the energy management module 145 illustrated in FIG. 1 or 2. In some configurations, the method 500 may be implemented in conjunction with the application 140 and/or the user interface 135 illustrated in FIG. 1.

At block 505, an aspect of a dwelling may be monitored. At block 510, an efficiency of an appliance may be calculated based on the energy consumption of the monitored appliance and a value associated with an operation of the appliance. At block 515, a trend of energy consumption may be calculated based on the energy consumption of the monitored appliance. At block 520, an energy efficiency score may be calculated for the monitored appliance and an overall energy score may be calculated for the dwelling. The energy efficiency score may be based on at least one of the monitored dwelling energy consumption and the energy consumption of the monitored appliance. At block 525, an occupant of the dwelling may be allowed to compare an energy efficiency score associated with the dwelling to an energy efficiency score associated with another dwelling. At block 530, a gaming user interface may be provided to the occupant to allow the occupant to compete for minimal energy consumption against at least one other occupant of another dwelling.

Figure 6:
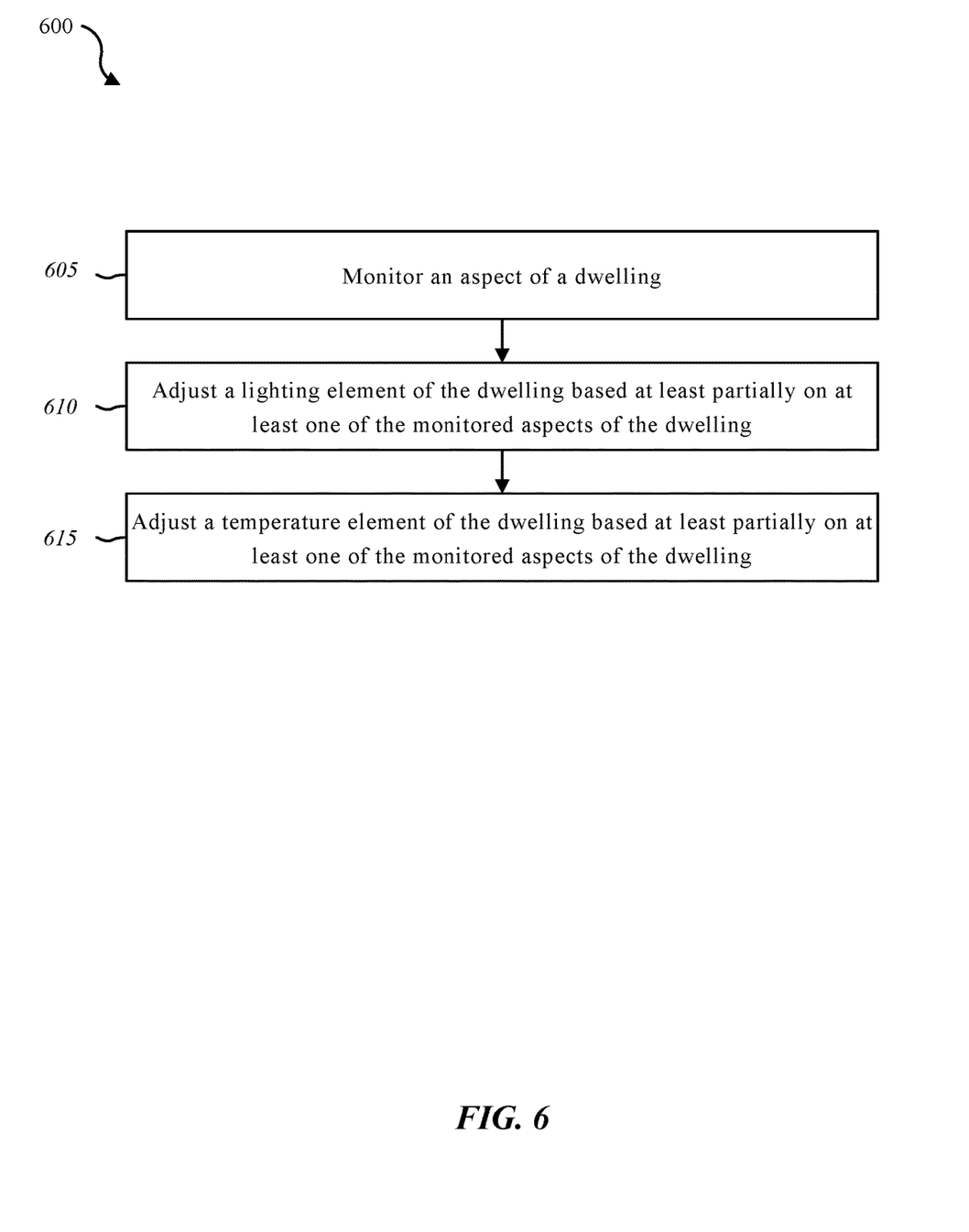
FIG. 6 is a flow diagram illustrating one embodiment of a method for adjusting lighting and temperature elements of a dwelling for improved energy management.

FIG. 6 is a flow diagram illustrating one embodiment of a method 600 for adjusting lighting and temperature elements of a dwelling for improved energy management. In some configurations, the method 600 may be implemented by the energy management module 145 illustrated in FIG. 1 or 2. In some configurations, the method 600 may be implemented in conjunction with the application 140 and/or the user interface 135 illustrated in FIG. 1.

At block 605, an aspect of a dwelling may be monitored. At block 610, a lighting element of the dwelling may be adjusted based at least partially on at least one of the monitored aspects of the dwelling. At block 615, a temperature element of the dwelling may be adjusted based at least partially on at least one of the monitored aspects of the dwelling.

Figure 7:
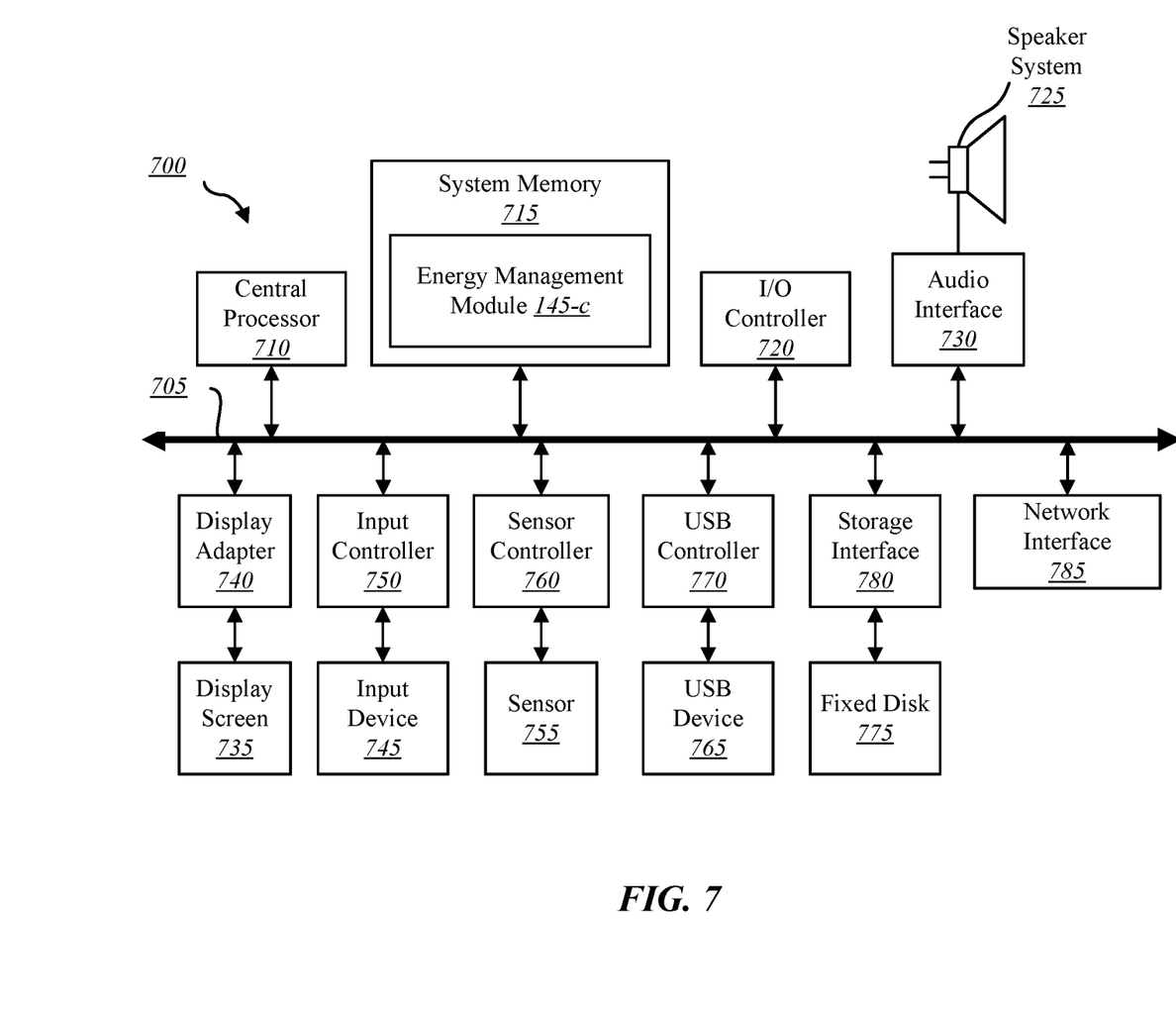
FIG. 7 depicts a block diagram of a computer system suitable for implementing the present systems and methods.

FIG. 7 depicts a block diagram of a controller 700 suitable for implementing the present systems and methods. The controller 700 may be an example of the set top box device 105, mobile computing device 150, and/or home automation controller 155 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the energy management module 145-c to implement the present systems and methods may be stored within the system memory 715. Applications (e.g., application 140) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for energy management, the method comprising:
    monitoring, by one or more sensors coupled to a hardware processor of an automation system, occupant activity and energy consumption at an aspect of a dwelling;
    configuring, by the hardware processor, a notification based at least in part on the monitoring, the notification comprising a first indication of the occupant activity and the energy consumption at the aspect of the dwelling and a second indication of adjustments to characteristics of a current state of the aspect of the dwelling;
    identifying one or more notification rules associated with a state of a device proximal to an occupant and one or more characteristics of the notification;
    altering a destination of the notification or a mode of communication for the notification, or both, based at least in part on the one or more notification rules and either the state of the device proximal to the occupant or the one or more characteristics of the notification, or both;
    transmitting the notification to the device proximal to the occupant, the notification including a display based at least in part on the one or more notification rules; and
    automatically implementing, by the hardware processor, the adjustments to the characteristics of the current state of the dwelling.

2. The method of claim 1, wherein the aspect of the dwelling comprises at least one of the dwelling energy consumption, a current energy price, a peak energy price, a current status of an appliance, an energy consumption of the appliance, a start time of a product used in association with the appliance, an estimated remaining amount of the product associated with the appliance, a detected motion of the occupant in the dwelling, a proximity of the occupant to the dwelling, a time of day, a lighting schedule, a programmable scene, a cost efficiency goal, a position of a door, a position of a window, a temperature inside the dwelling, a temperature outside the dwelling, a weather forecast, and a temperature schedule.

3. The method of claim 1, further comprising:
processing, by the hardware processor, aspects of the occupant activity and the energy consumption associated with the monitoring;
delivering, to a coupled server, the aspects of the occupant activity and the energy consumption; and
receiving information for providing a notification, the information comprising at least an evaluation of the aspect of the dwelling, comparison of the aspect of the dwelling relative to one or more additional aspects, or computed metrics of the aspect of the dwelling or the one or more additional aspects.

4. The method of claim 3, wherein the one or more additional aspects comprise monitored aspects of the dwelling, monitored aspects of one or more alternative dwellings, or a combination thereof.

5. The method of claim 1, wherein configuring the notification further comprises:
evaluating, at the hardware processor, the occupant activity and the energy consumption at the aspect of the dwelling;
processing, by the hardware processor, one or more suggested adjustments to the aspect of the dwelling based at least in part on the monitoring; and
configuring an indication of the notification, the indication comprising advice for implementing at least a portion of the one or more suggested adjustments to the aspect of the dwelling.

6. The method of claim 1, wherein configuring the notification further comprises:
detecting, at the hardware processor, anomalous energy consumption at the aspect of the dwelling based at least in part on the monitoring;
determining, by the hardware processor, one or more causes of the anomalous energy consumption; and
configuring an indication of the notification, the indication comprising the anomalous energy consumption and the one or more causes.

7. The method of claim 1, wherein configuring the notification further comprises:
comparing, by the hardware processor, the aspect of the dwelling to an energy policy;
determining, by the hardware processor, a deviation of the aspect of the dwelling relative to the energy policy based at least in part on the comparing; and
configuring an indication of the notification, the indication comprising the determined deviation of the aspect of the dwelling relative to the energy policy.

8. The method of claim 1, wherein configuring the notification further comprises:
identifying, at the hardware processor, the occupant activity or the energy consumption at the aspect of the dwelling satisfies a predetermined threshold; and
configuring an indication of the notification, the indication comprising one or more command instructions directed to the occupant based at least in part on the satisfaction of the predetermined threshold.

9. The method of claim 1, wherein transmitting the notification further comprises:
transmitting command instructions for displaying the notification at the device proximal to the occupant based at least in part on the one or more notification rules, the current state of the device proximal to the occupant, and the characteristics of the notification.

10. The method of claim 9, wherein the command instructions for displaying the notification include instructions for altering the current status of the device proximal to the occupant for displaying the notification, suspending display of the notification based at least in part on the current status of the device proximal to the occupant, or simultaneously displaying the notification in conjunction with the current status of the device proximal to the occupant, and wherein the current status of the device proximal to the occupant comprises content or programming displayed at the device proximal to the occupant.

11. The method of claim 1, further comprising:
learning one or more detectable motions associated with occupants of the aspect of the dwelling; and
detecting one or more detectable motions within the occupant activity at the aspect of the dwelling.

12. The method of claim 1, further comprising:
receiving a response indication from the occupant in response to transmitting the notification, the response indication comprising one or more instructions from the occupant; and
implementing variation to the adjustments to the characteristics of the current state of the dwelling based at least in part on the instructions of the response indication.

13. The method of claim 1, wherein automatically implementing, by the hardware processor, the adjustments to the characteristics of the current state of the dwelling further comprises:
adjusting, by the hardware processor, an operable aspect of a monitored appliance within or external to the aspect of the dwelling prior to a subsequent action of the hardware processor, wherein the monitored appliance remains in an on-state before, during, and after the adjusting.

14. The method of claim 13 wherein adjusting an operable aspect of the monitored appliance comprises adjusting a lighting element of the dwelling based at least partially on at least one of monitored aspects of the dwelling or adjusting a temperature element of the dwelling based at least partially on at least one of monitored aspects of the dwelling.

15. The method of claim 13, further comprising:
calculating a trend of energy consumption based on the energy consumption of the monitored appliance.

16. The method of claim 13, further comprising:
including in the notification a reminder to replace a product used in association with the monitored appliance, the reminder being at least partially based on a start time of the product used in association with the monitored appliance.

17. A computing device configured for energy management, comprising:
a processor;
memory in electronic communication with the processor, wherein the memory stores computer executable instructions that when executed by the processor cause the processor to perform the steps of:
monitoring, by one or more sensors coupled to a hardware processor of an automation system, occupant activity and energy consumption at an aspect of a dwelling;

configuring, by the hardware processor, a notification based at least in part on the monitoring, the notification comprising a first indication of the occupant activity and the energy consumption at the aspect of the dwelling and a second indication of adjustments to characteristics of a current state of the aspect of the dwelling;

identifying one or more notification rules associated with a state of a device proximal to an occupant and one or more characteristics of the notification;

altering a destination of the notification or a mode of communication for the notification, or both, based at least in part on the one or more notification rules and either the state of the device proximal to the occupant or the one or more characteristics of the notification, or both;

transmitting the notification to the device proximal to the occupant, the notification including a display based at least in part on the one or more rules; and automatically implementing, by the hardware processor, the adjustments to the characteristics of the current state of the dwelling.

18. A non-transitory computer-readable storage medium storing computer executable instructions that when executed by a processor cause the processor to perform the steps of:

monitoring, by one or more sensors coupled to a hardware processor of an automation system, occupant activity and energy consumption at an aspect of a dwelling;

configuring, by the hardware processor, a notification based at least in part on the monitoring, the notification comprising a first indication of the occupant activity and the energy consumption at the aspect of the dwelling and a second indication of adjustments to characteristics of a current state of the aspect of the dwelling;

identifying one or more notification rules associated with a state of a device proximal to an occupant and one or more characteristics of the notification;

altering a destination of the notification or a mode of communication for the notification, or both, based at least in part on the one or more notification rules and either the state of the device proximal to the occupant or the one or more characteristics of the notification, or both;

transmitting the notification to the device proximal to the occupant, the notification including a display based at least in part on the one or more rules associated with the device proximal to the occupant and the notification; and automatically implementing, by the hardware processor, the adjustments to the characteristics of the current state of the dwelling.

\* \* \* \* \*